United States Patent Office 3,056,786
Patented Oct. 2, 1962

3,056,786
C-SUBSTITUTED PIPERAZINE DERIVATIVES
AND METHOD
Arthur P. Phillips, Tuckahoe, N.Y., assignor to Burroughs
Wellcome & Co. (U.S.A.) Inc., Tuckahoe, N.Y., a corporation of New York, and The Wellcome Foundation,
Ltd., London, England, a British company
No Drawing. Filed Mar. 30, 1960, Ser. No. 18,498
Claims priority, application Great Britain Oct. 31, 1957
9 Claims. (Cl. 260—268)

The present invention relates to certain C-substituted piperazines and the manufacture thereof. In recent years many valuable drugs containing piperazine systems have been developed. (See for example Baltzly et al. Patents 2,436,685; 2,630,635; 2,742,472; 2,748,126; 2,767,186; Harfenist application 453,970, now Patent No. 2,880,209, and others.) Piperazine itself and a number of simple C-alkyl piperazines are commercially available but these are not readily employed in chemical synthesis except through attachment on the nitrogen atoms. The compounds of the present invention contain carbon-attached side chains easily capable of further reaction and conversion into valuable pharmaceutical products. This application is a continuation-in-part of Patent No. 2,958,693, issued November 1, 1960.

The method of the present invention is the reaction of an ethylene diamine which may have an alkyl substitution on either or both nitrogen atoms or on the carbon atoms with unsaturated ketoesters having an ethylenic bond conjugated between the carbonyl radicals:

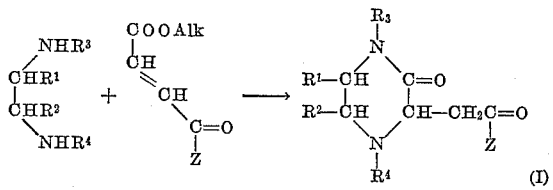

wherein Alk is an alkyl group (such as methyl or ethyl), $R^1$, $R^2$, $R^3$, $R^4$ are alkyl or aralkyl groups or hydrogen and Z is selected from the class consisting of the aryl and lower alkyl radicals. Thus, if Z is methyl, the reagent is an ester of acetyl acrylic acid, if a phenyl group of benzoyl acrylic acid. Since alcohol is split off during the reaction (as an alcohol) its identity is of minor importance for the reaction.

The reaction probably proceeds through a Michael addition of one nitrogen to the conjugated ethylenic bond giving II

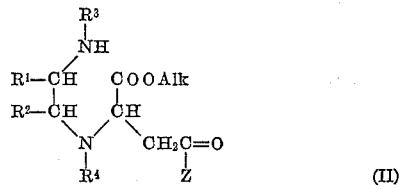

which then cyclizes.

When $R^3$ and $R^4$ are hydrogen, the reaction proceeds rapidly and in good yield, generally affording a crystalline product. In such cases the reactants can advantageously be dissolved in ether or a similar solvent and the product is obtained immediately in a usable form.

When $R^3$ and $R^4$ are alkyl or aralkyl groups the reaction is appreciably slower and requires heat to be finished in a convenient time, however, the yields are still very satisfactory (70% or better). The temperature used is conveniently in the range 100–200° and the course of the reaction can be followed by collecting the alcohol that is distilled off and measuring its quantity. Those products tend to be oils and are purified by vacuum distillation.

When $R^3$ and $R^4$ are different, isomeric products may be formed though one will usually preponderate. It is believed that when one of these is hydrogen and the other alkyl or benzyl, the hydrogen will function as $R^4$, but the generality of this is not yet established.

The useful employment of the compounds of this invention will be easily perceived by a skilled chemist. Thus on alkylation of compound I only one nitrogen will react giving a mono N-alkyl piperazine III (isomeric with that to be expected from employment of $$RNHCH_2CH_2NH_2$$

in the original reaction). Reduction (as with $LiAlH_4$) of the compounds of type I affords C-substituted piperazines IV having an alcoholic hydroxyl ($R^5$=alkyl or aryl, according to the nature of Z). Esters from type IV with benzoyl, mandelic, atropic, diphenylacetic and benzilic acids or the like readily prepared by known methods have local anaesthetic and spasmolytic properties.

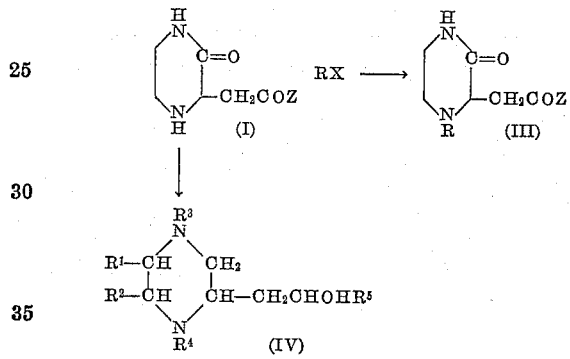

Compounds of type IV can be re-oxidized with chromic acid to give compounds of type V which can react with a Grignard reagent (such as phenylmagnesium bromide) or a lithium alkyl (such as 2-pyridyl-lithium) to give tertiary alcohols VI (where $R^6$ is phenyl, pyridyl or the like) which have spasmolytic and antihistaminic properties.

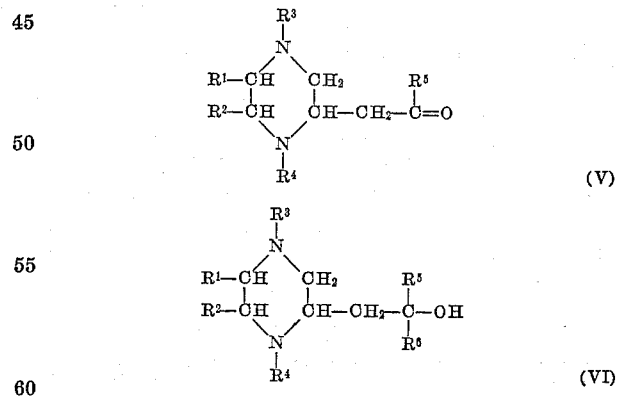

EXAMPLE 1

2-Phenacylpiperazin-3-One

A solution of 19 g. (0.1 M) of methyl-β-benzoylacrylate in 300 cc. of ether was treated with 7 g. (0.11 M) of ethylenediamine. The reaction mixture became turbid at once and white crystals started to appear in a few minutes. After several hours the 2-phenacylpiperazin-3-one was collected and was recrystallized from an acetone-ether mixture. The yield amounted to 11 g. (50%) melting at 99–100° C. The hydrochloride of this base melted at 221–222° C.

EXAMPLE 2

*Preparation of 1,4-Dimethyl-2-Phenacylpiperazin-3-One*

On mixing 9.5 g. (0.05 M) of methylbenzoylacrylate and 7 g. (0.075 M) of N,N'-dimethylethylene diamine a mild exothermic reaction occurred at once. This mixture was heated in a metal bath for 2 hours, the bath temperature being gradually raised from 115–165° C. The reaction vessel was provided with a reflux condenser equipped with a Dean-Stark trap. The rate and extent of the cyclization reaction could be followed by noting the methanol collected in the Dean-Stark trap. The theoretical amount of methanol (2.4–2.5 cc.) was collected in about 1½ hours. The reaction mixture was heated for ½–1 hour at 200° C. in vacuo to remove excess volatile reagents, and the product was then suitable for further use. The yield was 12 g. (100%).

The product could be distilled in vacuo and boiled at 200–210° C. at 2 mm.

The hydrochloride melted at 208–210° C. (dec.) and was recrystallized from ethanol.

The base formed a 1-methiodide, when treated with methyl iodide in acetone or methanol. This salt melted at 207–208° C. (dec.) and was recrystallized from methanol.

EXAMPLE 3

*Preparation of 2-(2'-Fluorenoyl)Methyl Piperazin-3-One*

A mixture of 28 g. (0.1 M) of methyl β-(2-fluorenoyl) acrylate, 300 cc. of methanol and 15 cc. of 98% ethylene diamine was heated on the steam bath for a few (less than 5) minutes. All the unsaturated ester dissolved rapidly, and the white crystalline product came out at once. After standing for ½ hour at room temperature the product was collected; the yield was 31 g. (100%), M.P. 205–210° C. (dec.). After recrystallization from much hot methanol the yield was 28 g. (95%); M.P. 205–207° C.

EXAMPLE 4

*2-(p-Phenoxyphenacyl)Piperazin-3-One*

Ethylene diamine was reacted with methyl p-phenoxybenzoylacrylate by the method of Example 3. The product, obtained in nearly quantitative yield, melted at 153–154° C. after recrystallization from alcohol.

EXAMPLE 5

*2-(5'-Acenaphthoyl Methyl) Piperazin-3-One*

This compound was obtained by the method of Example 3 by reaction of ethylene diamine and methyl 5'-acenaphthoyl acrylate. It melts at 152–154° after crystallization from alcohol.

EXAMPLE 6

*2-(p-Phenylphenacyl) Piperazin-3-One*

This was obtained by the method of Example 3 from ethylene diamine and methyl p-phenylbenzoyl acrylate. It was recrystallized from ethanol and then melted at 185–186° C.

EXAMPLE 7

*2-Acetonyl Piperazin-3-One*

Ethylene diamine reacted with ethyl acetyl acrylate to yield a syrupy product that was distilled at 0.1 mm. pressure.

What I claim is:

1. A compound having the formula:

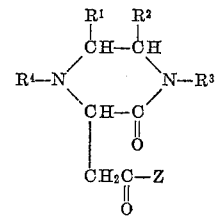

wherein $R^1$ and $R^2$ are selected from the class of lower alkyl and hydrogen, $R^3$ and $R^4$ are selected from the class consisting of lower alkyl, benzyl and hydrogen and Z is a radical selected from the class consisting of carbocyclic aryl and lower alkyl.

2. 2-phenacylpiperazin-3-one.
3. 1,4-dimethyl-2-phenacylpiperazin-3-one.
4. 2-(2'-fluorenoyl)methyl piperazin-3-one.
5. 2-(p-phenoxyphenacyl) piperazin-3-one.
6. 2-(5'-acenaphthoyl methyl) piperazin-3-one.
7. 2-(p-phenylphenacyl) piperazin-3-one.
8. 2-acetonyl piperazin-3-one.
9. A method of producing compounds of the formula

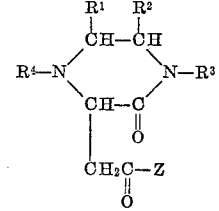

wherein $R^1$ and $R^2$ are selected from the class of lower alkyl and hydrogen, $R^3$ and $R^4$ are selected from the class consisting of lower alkyl, benzyl and hydrogen and Z is a radical selected from the class consisting of carbocyclic aryl and lower alkyl, which comprises the reaction of a compound of the formula

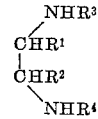

with a compound of the formula

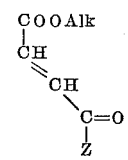

wherein $R^1$, $R^2$, $R^3$ and $R^4$ and Z have the above values at a temperature from room temperature to 200° C. and recovering the product.

No references cited.